Nov. 1, 1938.     L. E. COBB     2,134,703
FILTER DRUM CONSTRUCTION
Filed Aug. 19, 1937
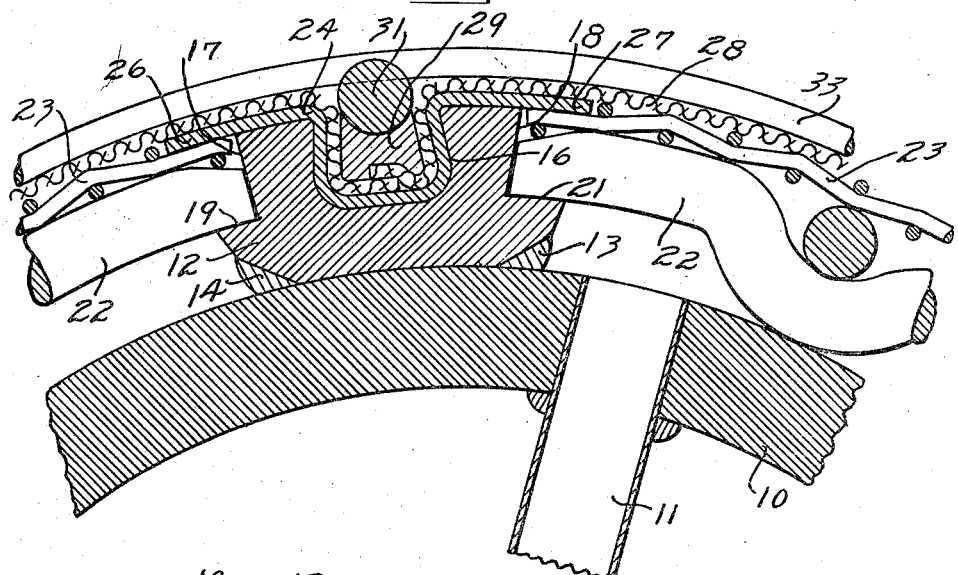
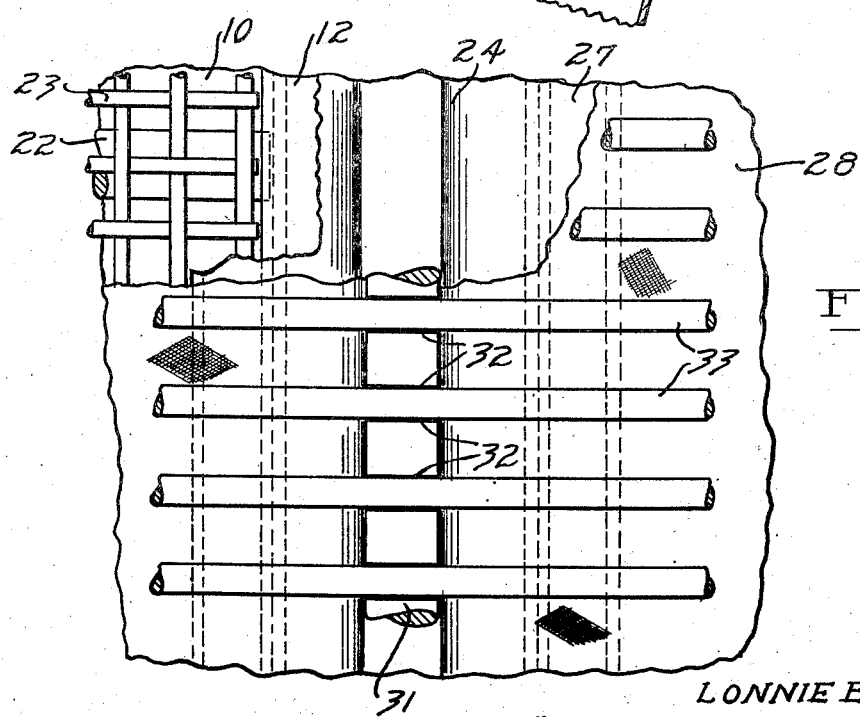
Inventor
LONNIE E. COBB Patented Nov. 1, 1938

2,134,703

UNITED STATES PATENT OFFICE 2,134,703

FILTER DRUM CONSTRUCTION

Lonnie E. Cobb, Birmingham, Ala., assignor to Goslin-Birmingham Manufacturing Company, Inc., a corporation of Alabama Application August 19, 1937, Serial No. 159,902

5 Claims. (Cl. 210—199)

This invention relates to continuous drum type filters, and has for its object the provision of an improved means for dividing the drum into filter sections, which shall be simple and rugged, and which may be disassembled and repaired without resorting to soldering or welding.

Another object of my invention is the provision of a filter drum construction in which the cloth supporting elements shall be held firmly in place and be free to expand and contract relative to the drum.

In the filtering of certain substances, particularly in the dewaxing of oils, the sections of a filter drum are successively subjected to widely varying temperatures. For example, the temperatures may vary from −20° F. to 212° F. in one revolution of the drum. The successive changes in temperature bring about successive contractions and expansions of the parts which finally lead to breaks in the welding or soldering, particularly where the drainage or cloth supporting members are joined to the drum. Where substances of a highly volatile and combustible nature are present, repairs involving soldering or welding cannot be made to the drum in place, and it has often been necessary to dismantle completely the filter and remove the drum from the building where it is installed in order to make the necessary repairs.

It is accordingly the principal object of my invention to provide a construction in which the various members making up the several parts of a filter drum section shall be detachably mounted on the drum, free to expand and contract, and held in place by an overhanging plate member carried by the division strip, whereby the same may be readily disassembled and reassembled without the use of heat.

Apparatus embodying features of my invention is illustrated in the accompanying drawing forming a part of this application in which—

Fig. 1 is a fragmentary cross sectional view of a filter drum drawn to an enlarged scale and with shortened radius, the better to illustrate the same; and Fig. 2 is a plan view of the parts shown in Fig. 1 with certain parts broken away.

Referring to the drawing, I show a fragment 10 of a filter drum having the usual drainage pipe 11. Extending longitudinally of the drum to divide it into sections are a plurality of division strips 12, only one of which is shown as they are all identical in construction. The strips 12 are secured liquid tight to the drum 10, as by welding, at 13 and 14. Each division strip 12 is provided with a continuous undercut or dovetail groove 16 and has its sides rabbeted at 17 and 18 to provide lateral shoulders 19 and 21. Resting on the shoulders 19 and 21 and on the outer surface of the drum 10 is a relatively coarse mesh drainage or filter cloth supporting medium 22 made of relatively heavy wire, for example, around 0.20 inch in diameter. On the coarse mesh medium 22 is a finer wire mesh cloth supporting medium 23 which may be on the order of a 7 x 7 mesh, whereas the coarser medium 22 may have openings of an area of around two square inches. It will be understood that these cloth supporting members 22 and 23 are cut to fit snugly between adjacent division strips 12, as shown on the two sides of the strip 12 in the drawing.

Fitting within the dovetail groove 16 is a plate member 24 which is shaped to fit snugly within the groove and extends laterally, provided flanges 26 and 27 which overhang the sides of the division members 12 and bear against the filter cloth supporting medium 23, which in turn bears downwardly on the medium 22 to hold it in place.

The filter cloth is shown at 28 and has its ends brought downwardly into the groove 16 over the plate 24, as shown in the drawing. It is calked in place by lead calking 29, which calking serves the purpose not only to hold the filter cloth in place, but to hold the plate member 24 snugly in the groove 16. Resting on the calking material 29, in a suitable groove formed therein, is a spacing rod 31 which extends longitudinally of the drum and which is provided with notches 32 for the drum winding 33, thus serving to space the windings and hold them in place. The winding, as is well understood is of suitable wire and holds the filter cloth down and prevents it being torn away upon a reverse flow of pressure. In addition, the winding 33, in accordance with my improved design, serves to hold the flanges 26 and 27 firmly in contact with the filter cloth supporting medium beneath them. There is accordingly no necessity for welding or soldering.

In assembling my improved apparatus, the coarse supporting screens 22 and 23 are first cut to fit snugly between adjacent division strips and are mounted in the section with their edges abutting the sides of the division strips and resting on the shoulders 19 and 21 of adjacent strips. The plate member 24, first properly formed, as is well understood, is next placed in the groove 16 and hammered to a snug fit therein with the flanges overhanging the sides and resting on the screens 22 and 23. The cloth is next placed upon the drum and calking, preferably lead, is driven into place in the groove 16 over the ends of the filter cloth, as shown, and acts to prevent loosening of the plate member 24 in the groove, as well as to hold the ends of the cloth in place. The wire winding is next applied to the drum in the usual manner, the separate convolutions being held in place laterally by the notches 32 in the spacing rod 31.

It will be readily appreciated that the parts may be disassembled and reassembled in a like manner, and that when assembled they are held firmly in place. From the foregoing it will be apparent that I have devised an improved filter drum construction which is simple of design, easily constructed, and which may be assembled and disassembled without soldering or welding. The cloth supporting members being held in place only by the cooperation of the winding, the cloth, and the overhanging flanges of the plate 16, are free to expand and contract with changing temperatures, without danger of damage to the filter.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a drum type continuous filter, a filter section comprising a division strip extending longitudinally of the drum, said strip having a dovetail groove extending longitudinally in the upper surface thereof and having lateral shoulders, filter cloth supporting members resting on the shoulders, a metal plate shaped to fit within the undercut groove and overhang the cloth supporting members, filter cloth extending over the plate and into the groove, means for calking the filter cloth and holding the plate in place, and a wire winding over the filter cloth.

2. In a drum type continuous filter, means for dividing the drum surface into filter sections comprising a division strip secured to and extending longitudinally of the drum, said strip having a dovetail groove extending longitudinally in its upper surface, cloth supporting members abutting the sides of the division strip, a metal plate shaped to fit in the groove and overhanging the cloth supporting members to hold them in place, cloth extending over the supporting members and into the groove, and means for securing the cloth and the plate in the groove.

3. In a drum type continuous filter, means for dividing the outer surface of the drum into filter sections comprising a division strip extending longitudinally thereof and having a longitudinal undercut groove in its outer surface, a metal plate formed to fit in the groove, flanges on the plate overhanging the sides of the division strip, cloth supporting members on the drum and fitting alongside the division strip beneath the flanges, filter cloth over the supporting members, and calking in the longitudinal groove effective to hold the ends of the filter cloth and the plate in place.

4. In a drum type continuous filter, means for dividing the outer surface of the drum into filter sections comprising a division strip extending longitudinally thereof and having a longitudinal undercut groove in its outer surface, a metal plate formed to fit in the groove and overhang the sides of the division strip, cloth supporting members on the drum fitting alongside the division strip beneath the overhanging plate, filter cloth over the supporting members, calking in the longitudinal groove effective to hold the ends of the filter cloth and the plate in place, a spacing strip resting on the calking, and a wire winding surrounding the drum held in position laterally by the spacing strip and serving to hold the cloth and the plate against the supporting members.

5. In a drum filter, means for dividing the surface of the drum into sections comprising a plurality of division strips extending longitudinally of the drum, each having a dovetail groove in its upper surface, cloth supporting members fitting between the division strips and abutting the sides thereof, a plate shaped to fit in each of the dovetail grooves and overhang the supporting members, cloth over the supporting members and extending into the grooves over the plates, means to calk the cloth in each of the grooves and hold the plate in place, and a wire winding around the drum to hold the cloth and the overhanging portions of the plate against the cloth supporting members.

LONNIE E. COBB.